United States Patent [19]

Sinkula

[11] 3,888,916

[45] June 10, 1975

[54] AMANTADINE SALT OF 16,16-DIMETHYL-PGE$_2$

[75] Inventor: Anthony A. Sinkula, Kalamazoo, Mich.

[73] Assignee: The Upjohn Company, Kalamazoo, Mich.

[22] Filed: Aug. 1, 1974

[21] Appl. No.: 493,544

[52] U.S. Cl. ...... 260/501.1; 260/468 D; 260/514 D; 424/316
[51] Int. Cl. ............................................ C07c 97/00
[58] Field of Search ..................... 260/501.17, 501.1

[56] References Cited
UNITED STATES PATENTS 3,657,327  4/1972  Morozowich ................. 260/501.17
3,703,544  11/1972  Morozowich ................. 260/501.17
3,759,978  9/1973  Lincoln, Jr. .................. 260/501.1 X Primary Examiner—Joseph E. Evans
Assistant Examiner—G. Breitenstein
Attorney, Agent, or Firm—Bruce Stein

[57] ABSTRACT

The amantadine salt of 16,16-dimethyl-PGE$_2$, free-flowing crystals of the same, and the process for producing the same are disclosed. The salt in crystalline and non-crystalline form is useful for the same pharmacological and medical purposes as 16,16-dimethyl-PGE$_2$ and is useful as a means for purifying 16,16-dimethyl-PGE$_2$.

2 Claims, No Drawings

AMANTADINE SALT OF 16,16-DIMETHYL-PGE$_2$

DESCRIPTION OF THE INVENTION

This invention relates to free-flowing crystals and novel methods for producing the same. In particular, this invention relates to free-flowing crystals of the amantadine salt of 16,16-dimethyl-PGE$_2$ a compound of the formula

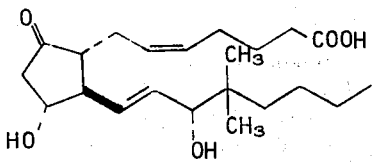

I

Amantadine (1-adamantanamine, 1-aminoadamantane) is a compound of the formula

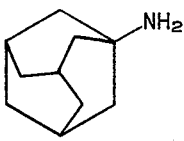

II see the Merck Index, Merck and Co. Rathway, New Jersey (1968) page 48.

16,16-Dimethyl-PGE$_2$ is known to be useful for a variety of pharmacological and medical purposes, for example, to control excessive gastric secretions, to control platelet aggregation, to control the reproductive cycle of female mammals, including humans, for smooth muscle stimulation, and for nasal decongestion. For these purposes the usual route of administration is intravenous injection, or infusion or oral. See German Offenlegungsschrift 2217044, Derwent Farmdoc 71483T.

16,16-Dimethyl-PGE$_2$, a carboxylic acid, does not dissolve readily in water, hydroalcoholic (water-ethyl alcohol) solutions, or the isotonic solutions necessary for intravenous injection or infusion. Preliminary treatment of the prostaglandin with a water-miscible organic solvent and/or an aqueous solution of a base, for example, sodium hydroxide or sodium carbonate is usually necessary before an isotonic aqueous solution of the proper concentration can be formed. Moreover, 16,16-dimethyl-PGE$_2$ is a viscous oil which is difficult to purify and which is slow in dissolving in aqueous basic solutions.

There would be a substantial advantage to having available 16,16-dimethyl-PGE$_2$ in the form of a stable crystalline high melting salt which is rapidly soluble in water, in hydroalcoholic solutions, or in the isotonic solutions necessary for intravenous administration. There would also be substantial advantage in being able to produce preparations of the desired degree of purity of 16,16-dimethyl-PGE$_2$.

16,16-Dimethyl-PGE$_2$ and the process for making the same is known in the art. See German Offenlegungsschrift 2217044, Derwent Farmdoc 71483T.

I have made the surprising and unexpected discovery that the amantadine salt of 16,16-dimethyl-PGE$_2$ is more stable to thermal decomposition than the free acid. It therefore has a greater shelf life which provides for easier storage conditions. The amantadine salt of 16,16-dimethyl-PGE$_2$ is useful for the same pharmacological and medical purposes as 16,16-dimethyl-PGE$_2$.

I have also made the surprising and unexpected discovery that free-flowing crystals of the amantadine salt of 16,16-dimethyl-PGE$_2$ are produced by mixing a solution of 16,16-dimethyl-PGE$_2$ in acetonitrile with amantadine in butyronitrile at room temperature. The resulting solution is cooled to the range of about −20° to 20° C. until crystals are formed. These free-flowing salt crystals are non-hydroscopic, easily dried, and free of water and solvent molecules. They also dissolve rapidly and completely in water, in hydroalcoholic solutions, and in the usual isotonic solutions used for intravenous injection or infusion.

The production of the amantadine salt of 16,16-dimethyl-PGE$_2$ in free-flowing crystalline form is especially surprising and unexpected since the product is an oil when prepared by conventional methods for making amine salts utilizing alternative solvent systems. The salt in oil form is difficult to handle and purify and slow to dissolve in water, hydroalcoholic, and isotonic solutions.

In carrying out the novel process of this invention, it is desirable to use equivalent molar amounts of the prostaglandin and amantadine. Using less than an equivalent amount of the amine will result in part of the prostaglandin remaining in solution.

It is preferred that proportions of acetonitrile and butyronitrile be such that the maximum amount of salt crystallizes from the solvent mixture, as will be readily determined by one skilled in the art.

It is advantageous to add the amantadine to the butyronitrile and heat to about 40° to 80° C. to effectuate solution. The solution should then be cooled to about room temperature. The 16,16-dimethyl-PGE$_2$ is advantageously dissolved in acetonitrile without heating. The 16,16-dimethyl-PGE$_2$ solution is then added dropwise with vigorous stirring to the butyronitrile solution of amantadine. The resulting mixture is cooled to about −20° to 20° C. to promote crystallization.

I have also made the surprising and unexpected discovery of a manufacture or a process for preparing free-flowing crystals of the amantadine salt of 16,16-dimethyl-PGE$_2$ which comprises the steps of:

1. dissolving amantadine in a liquid organic solvent forming a solution;
2. dissolving 16,16-dimethyl-PGE$_2$ in a second liquid organic solvent forming a second solution;
3. adding the product of step 2 to the product of step 1 to form a solution of the amantadine salt of 16,16-dimethyl-PGE$_2$;
4. cooling the product of step 3 to about −20° to 20° C. until crystals have formed; and
5. collecting the crystals.

In this process, it is preferred that the liquid organic solvent is butyronitrile. It is also preferred that the second liquid organic solvent is acetonitrile.

When the process is first carried out it is advantageous to do it in a glass vessel, the inner walls of the vessel being scratched vigorously with a glass rod when the mixture just starts to become cloudy. Doing so will hasten crystal formation. In subsequent preparations, a few crystals from this first crystallization can be added as seeds at the same point of initial clouding to hasten crystal formation, and a glass vessel need not be used.

After this initial cooling and crystallization, the mixture is maintained at the same temperature until no further crystallization occurs. The crystals are then collected by conventional techniques, e.g. filtration or centrifugation and washed with a small amount of the solvent mixture. Most of the solvent mixture is removed either under reduced pressure or in a current of warm nitrogen or argon. The crystals are then ground to a finer particle size if desired, and dried. Drying is completed by heating in the range about 50° to about 70° C.

When the amantadine salt of 16,16-dimethyl-$PGE_2$ is prepared by the above procedure, the purity is such that recrystallization is unnecessary.

When recovery of 16,16-dimethyl-$PGE_2$ from the amantadine salt is desired, it is accomplished by dissolving the salt in water, adjusting the pH of that solution to the range 6 to 7, and extracting the solution repeatedly with ethyl acetate. The ethyl acetate extracts are combined, washed successively with water, and saturated aqueous sodium chloride solution, dried and evaporated to give 16,16-dimethyl-$PGE_2$.

The invention can be more fully understood by the following example.

EXAMPLE 1

Free-flowing crystals of the amantadine salt of 16,16-dimethyl-$PGE_2$

A solution of 16,16-dimethyl-$PGE_2$ (589.82 mg.), dissolved in 15 ml. of acetonitrile, is added dropwise with vigorous stirring to a solution of amantadine (226.0 mg.) dissolved in 50 ml. of butyronitrile. The solution is stirred for about 1 hour. The solution is then cooled to 4° C. with crystallization resulting. The resulting crystals are collected by filtration, washed on the filter with butyronitrile/acetonitrile. The product is dried at room temperature under vacuum. The yield is 594.5 mg. The melting point is 86°–87.7° C. Infrared spectral peaks are at 3,400, 2,600, 1,625, 1,550, 1,400, 1,080, 1,000, and 980 cm.$^{-1}$. The ultraviolet spectrum in basic ethanol is $\lambda_{max} = 280$ nm ($\epsilon = 25,900$).

I claim:
1. The amantadine salt of 16,16-dimethyl-$PGE_2$.
2. Free-flowing crystals of the amantadine salt of 16,16-dimethyl-$PGE_2$.

* * * * *